United States Patent
Huebner et al.

(10) Patent No.: US 9,291,324 B2
(45) Date of Patent: Mar. 22, 2016

(54) CENTER HIGH MOUNTED STOP LIGHT

(71) Applicant: Ford Global Technologies, LLC, Dearborn, MI (US)

(72) Inventors: Annette Lynn Huebner, White Lake, MI (US); Artur Sakarian, Birmingham, MI (US); Kristin Ann Hellman, Walled Lake, MI (US); Ryan Welch, Ottawa Lake, MI (US); Gerald Douglas Neely, Canton, MI (US); Josh Greiner, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 35 days.

(21) Appl. No.: 14/153,389

(22) Filed: Jan. 13, 2014

(65) Prior Publication Data
US 2015/0198300 A1  Jul. 16, 2015

(51) Int. Cl.
| | |
|---|---|
| F21S 8/10 | (2006.01) |
| B60Q 1/24 | (2006.01) |
| B60Q 1/26 | (2006.01) |
| B60Q 1/30 | (2006.01) |

(52) U.S. Cl.
CPC . *F21S 48/20* (2013.01); *B60Q 1/24* (2013.01); *B60Q 1/2692* (2013.01); *B60Q 1/302* (2013.01)

(58) Field of Classification Search
CPC ...... B60Q 1/24; B60Q 1/2607; B60Q 1/2692; B60Q 1/2661; B60Q 1/48
See application file for complete search history.

(56) References Cited

U.S. PATENT DOCUMENTS

| | | | | |
|---|---|---|---|---|
| 2,736,005 A | * | 2/1956 | Craddock | 340/472 |
| 4,628,417 A | * | 12/1986 | Kaminski et al. | 362/485 |
| 4,851,970 A | * | 7/1989 | Bronder | 362/485 |
| 4,896,136 A | * | 1/1990 | Hotovy | 340/468 |
| 5,580,153 A | * | 12/1996 | Motz | 362/496 |
| 5,944,406 A | * | 8/1999 | Hansen | 362/487 |
| 6,030,105 A | * | 2/2000 | Thau et al. | 362/488 |
| 6,350,049 B1 | * | 2/2002 | Zimmermann et al. | 362/496 |
| 6,474,715 B2 | * | 11/2002 | Fukushima | B60R 5/04 296/37.1 |
| 6,786,623 B2 | | 9/2004 | Snyder et al. | |
| 7,705,720 B2 | * | 4/2010 | Jachmann | 340/473 |
| 7,777,615 B2 | | 8/2010 | Okuda et al. | |
| 7,834,750 B1 | * | 11/2010 | Hertz et al. | 340/468 |
| 8,237,557 B1 | | 8/2012 | Hertz et al. | |

(Continued)

FOREIGN PATENT DOCUMENTS

CN          201745487 U        2/2011

OTHER PUBLICATIONS
Pickup Specialties.Com; Truck Fog Lights and Truck Spotlights, 5 pages.

*Primary Examiner* — Anh Mai
*Assistant Examiner* — Zachary J Snyder
(74) *Attorney, Agent, or Firm* — Jason C. Rogers; Bejin Bieneman PLC

(57) ABSTRACT

A center high mounted stop light assembly for use in a vehicle includes a stop light housing movable in a passage located center high on a rear end of the vehicle between a first closed position and a second extended position in which utility lights coupled to the stop light housing are deployable and operable to illuminate an area near the rear end of the vehicle. A position sensor detects and signals the position of the stop light housing within the passage. The stop light housing may be manually operated between the open and closed position or may use an automated device for push button operation including of the utility lights.

20 Claims, 2 Drawing Sheets

(56) References Cited

U.S. PATENT DOCUMENTS

| | | | |
|---|---|---|---|
| 8,256,807 B2* | 9/2012 | Lucas | B60L 11/1877 293/106 |
| 8,538,637 B2* | 9/2013 | Girschick | 701/49 |
| 8,854,201 B1* | 10/2014 | Hertz et al. | 340/473 |
| 2003/0039126 A1* | 2/2003 | Fox | 362/485 |
| 2003/0063475 A1 | 4/2003 | Simmons | |
| 2007/0102609 A1* | 5/2007 | Nebeker | 248/291.1 |
| 2007/0197084 A1* | 8/2007 | Darolfi et al. | 439/470 |
| 2008/0310179 A1* | 12/2008 | Bates | 362/506 |
| 2010/0244697 A1* | 9/2010 | Illium et al. | 315/77 |
| 2012/0068492 A1* | 3/2012 | Lucas | B60R 7/02 296/37.1 |
| 2014/0300462 A1* | 10/2014 | Russ | 340/471 |

* cited by examiner

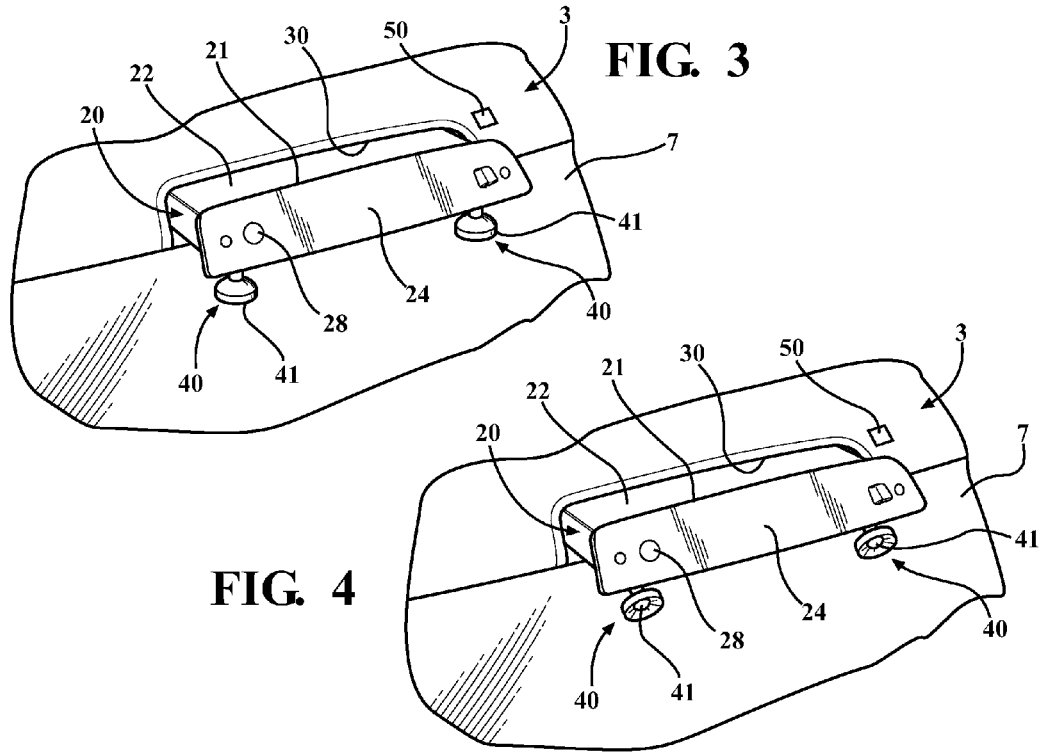
FIG. 3
FIG. 4
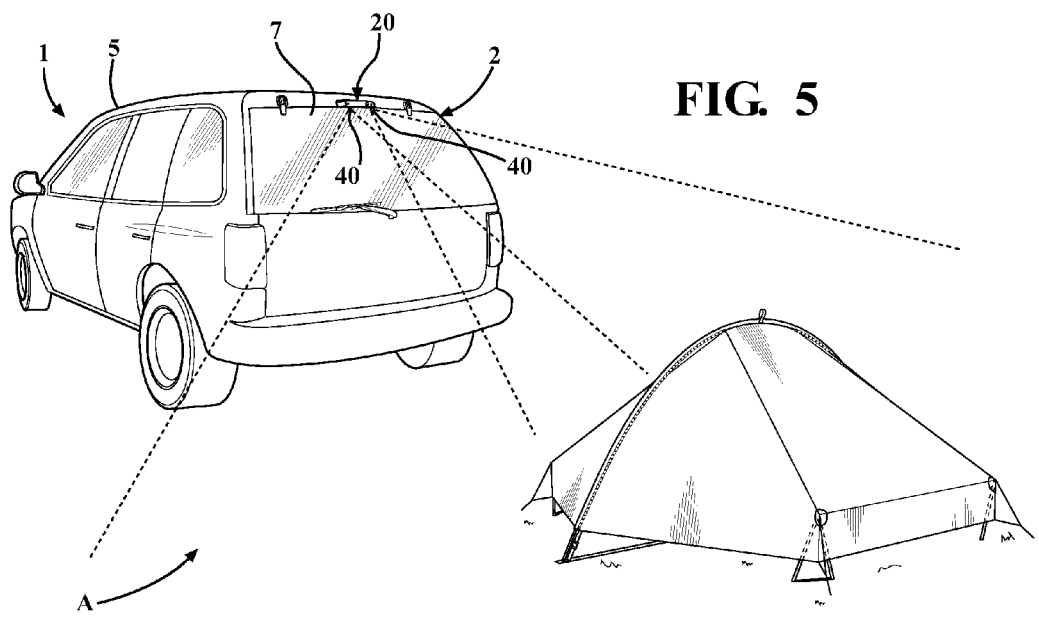
FIG. 5

CENTER HIGH MOUNTED STOP LIGHT

BACKGROUND

The present disclosure generally relates to vehicles and, more particularly, relates to a multi-functional brake light located at the center high mounted position and meeting applicable federal motor vehicle safety standard 108 and for use in providing lighting outside of the vehicle.

The lighting system of a vehicle generally consists of the lighting and signaling devices mounted or integrated to the front, sides, rear, and in some cases the top of the motor vehicle. The purposes of these devices are to provide illumination for the driver to operate the vehicle, to increase the visibility of the vehicle, and to provide indicator information about the vehicle's presence, position, size, direction of travel, and/or the driver's intentions regarding direction and speed of travel. As part of the vehicle's lighting and signalizing devices, it is generally known for a vehicle to include a center high mounted stop light (CHMSL) as it has been required as original equipment on passenger vehicles by Federal Motor Vehicle Safety Standard 108 since about 1986 and on all new light trucks since about 1994. The purpose of CHMSL is to better safeguard a car or light truck from being struck in the rear from another vehicle. When the brakes on a vehicle are applied, the CHMSL warns drivers of following the vehicle they should slow down. While the CHMSL has long been known, it remains relatively unchanged from its original design as implemented in the 1980s. There long remains a significant need to improve the lighting around a vehicle.

BRIEF DESCRIPTION OF THE DRAWINGS

FIG. 3 a partial, perspective, graphic view of the deployable, multi-functional, rear center high-mounted stop light (CHMSL) of FIG. 2 wherein the vehicle exterior lighting is deployed according to an exemplary embodiment of the present disclosure.

FIG. 4 a partial, perspective, graphic view of the device of FIG. 3 wherein the vehicle exterior lighting is deployed in an alternate position according to an exemplary embodiment of the present disclosure.

FIG. 5 is a perspective view of the vehicle using a CHMSL.

DETAILED DESCRIPTION

Figure 1:
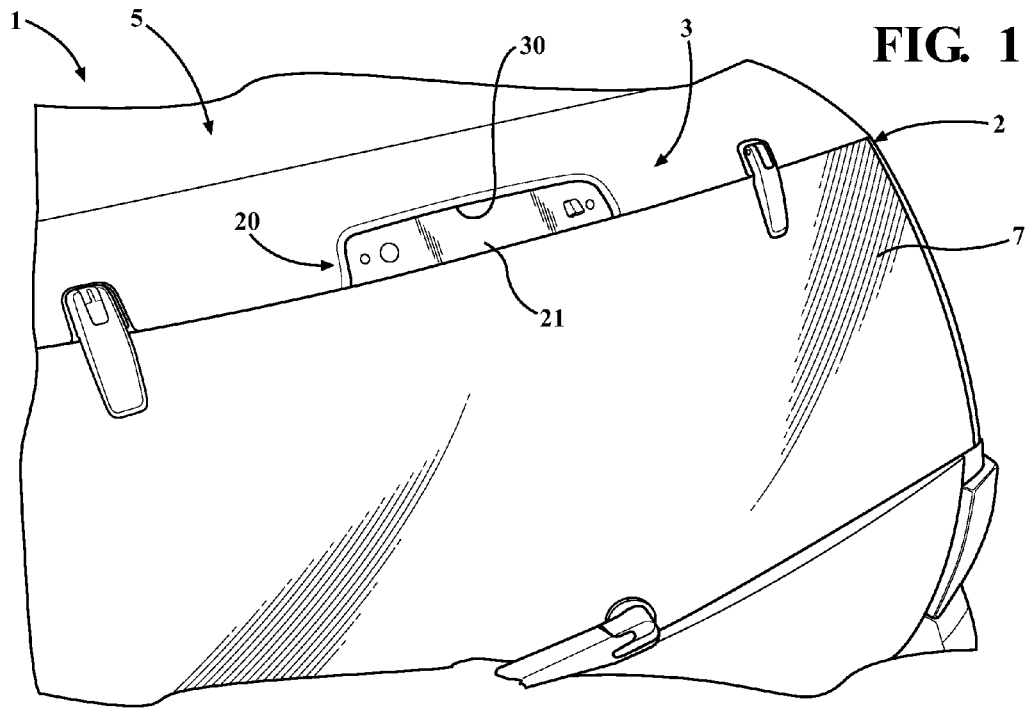
FIG. 1 is a perspective, graphic view of a rear end of a sport utility vehicle including a deployable, multi-functional, rear center high-mounted stop light (CHMSL) in a vehicle operating position according to an exemplary embodiment of the present disclosure.
Figure 2:
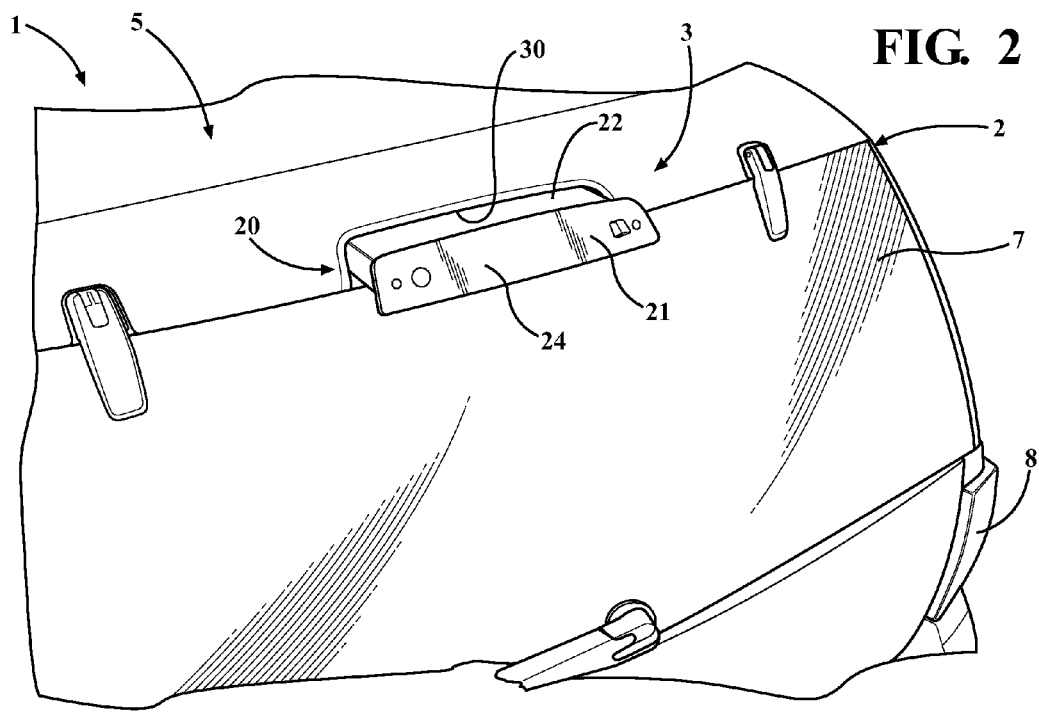
FIG. 2 is a perspective, graphic view of the rear end of the sport utility vehicle including the deployable, multi-functional, rear center high-mounted stop light (CHMSL) in a vehicle non-operating position according to an exemplary embodiment of the present disclosure.

Referring in general to all of the Figures and in particular to FIGS. 1 through 4 there is disclosed an exemplary embodiment of a center high mounted stop light (CHMSL) 20 for use on a vehicle 1, including, in particular, on a sport utility or cross-over type vehicle 1 as shown in FIG. 1. The vehicle 1 may include a rear end 2 having a liftgate 3. The liftgate 3 may include a window 7 hingedly connected to the liftgate 3. The vehicle one may further include a passage or recess 30 located center high on the liftgate 3 as best shown in FIGS. 1 and 2. The vehicle includes other stop lights 8.

In one exemplary embodiment of the present disclosure, the center high mounted stop light 20 may include a stop light housing 22 received in the passage 30 and movable between a first or closed position, as best shown in FIG. 1, and a second or extended position as best shown in FIG. 2. The center high mounted stop light 20 may further include an outer lens cover 21. The center high mounted stop light 20 may further include a plurality of stop lights 24 located within the stop light housing 22 and behind the outer lens cover 21.

In an exemplary embodiment of the present disclosure, the center high mount stop light 20 may include a latch for selectively coupling the stop light housing 22 in the passage 30 of the vehicle 1. The latch may be selectively operated for latching and unlatching the stop light housing 22 in the first closed position and/or the second extended position. It is contemplated that when the latch is actuated, the stop light housing 22 may move between the first closed position and the second extended position. The center high mount stop light 20 may further include an actuator 28 that may be linked or coupled to the latch. In an exemplary embodiment of the present disclosure, the actuator 28 may be located on the outer lens cover 21 of the center high mount stop light 20 as best shown in FIGS. 3 and 4. It is contemplated that the actuator may be mechanically or electrically linked to the latch for selectively operating the latch based upon a user's input to the actuator 28. In an alternate exemplary embodiment of the present disclosure, a second actuator 28 may be located within the vehicle 1 for use by an occupant therein. In a further alternate exemplary embodiment of the present disclosure, the second actuator 28 may be located near the operator of the vehicle 1. It is contemplated that the second actuator 28 located within the cab 5 of the vehicle 1 would be electrically coupled to the center high mount stop light 20.

The center high mount stop light 20 may further include utility lights 40 located on a lower surface of the stop light housing 22 for illuminating an area A located near or proximal the vehicle one, as best shown in FIG. 5. The utility lights 40 may be coupled to the stop light housing 22 such that the utility lights 40 may be recessed within the stop light housing 22 when in a first position such that the stop light housing 22 may be located in the first closed position within the passage 30. Once the stop light housing 22 is moved to the second extended position, the utility lights 40 may extend from the lower surface of the stop light housing 22 as best shown in FIGS. 3 and 4. Each utility light 40 may preferably include a LED spotlight 41 coupled to an adjustment mechanism 42 coupled to the stop light housing 22. It is further contemplated that the adjustment mechanism 42 may include any known or appropriate devices or mechanisms for selectively adjusting the direction in which the LED spotlight 41 is directed to allow a user of the utility lights 40 of the center high mount stop light 20 to customize the area A of the rear end 2 of the vehicle 1 to be illuminated.

Referring still to FIGS. 3 and 4, the center high mount stop light 20 may further include a sensor 50 located proximal the stop light housing 22 and passage 30 for determining the position of the stop light housing 22 within the passage 30. Preferably, the sensor 50 provides an indicator signal distinguishing when the center high mount stop light is in the first closed position, as shown in FIG. 1, and the second extended position as shown in FIG. 2. In one exemplary embodiment of the present disclosure, the utility lights 40 may preferably be rendered non-operational (i.e., non-illuminating) when the stop light housing 22 is in the first closed position. Preferably, the utility lights are automatically rendered non-operational using the position sensor 50 or any other type of mechanism for selectively coupling the power source to the utility lights

40. Similarly, the utility lights 40, in one exemplary embodiment of the present disclosure, may preferably be rendered operational (i.e. illuminating) when the stop light housing is in the second extended position. Further, it is contemplated that the utility lights 40 may be automatically deployed or extended from the stop light housing 22 when the stop light housing 22 is moved to the second extended position. It is also contemplated that the utility lights 40 may be automatically retracted into the stop light housing 22 when the stop light housing 22 is moved to the first closed position. In each of these contemplated alternate exemplary embodiments, it is believed that a biasing mechanism may be used to accomplish the automatic deployment of the utility lights 40. It is also contemplated that other mechanisms and linkages may also be used for automatically deploying and retracting the utility lights 40 in response to and/or independent of the movement of the stop light housing 22.

In a further alternate exemplary embodiment of the present disclosure, the center high mount stop light 20 may further include an automated mechanism for moving the stop light housing 22 within the passage 30 in the vehicle 1 between the first closed position and the second extended position. It is further contemplated in an exemplary embodiment of the present disclosure that the automated mechanism for moving the stop light housing 22 may further include a plurality of motors, gears, linkages, electronics, power supply and any other appropriate devices and mechanisms for operating the center high mount stop light 20 according to the various exemplary embodiments of the present disclosure.

In yet a further alternate exemplary embodiment of the present disclosure, the center high mount stop light 20 may be operated by a user pushing the actuator 28 to activate the automated motor assembly to move the stop light housing 22 toward the second extended position. Optionally, the motor assembly may pivot at least a portion of the stop light housing 22 in a direction away from the liftgate 3. In another embodiment, when a user operates the actuator 28 the latch is released and the stop light housing 22 automatically moves or presents itself to the user who may then manually move the stop light housing 22 to the second extended position.

In a further alternate exemplary embodiment of the present disclosure, the sensor 50 may preferably be coupled and in communication with the electronics of the vehicle 1. In particular, it is contemplated that the sensor 50 providing the signal indicative of the position of the stop light housing 22 may be communicated to the engine management system or other vehicle operation control for disabling normal operation of the vehicle 1 when the stop light housing 22 is in the second or extended position.

While the utility lights 40 are shown packaged at the corners of the center high mounted stop light 20, the utility lights 40 may be packaged anywhere along the outer surface of the center high mount stop light 20. It is contemplated that the utility lights 40 may be located anywhere along the outer surface of the stop light housing 22 as well as removably attachable thereto.

The center high mount stop light 20 of the present disclosure has particular utility in a meeting with hitching a trailer to the vehicle 1, particularly at night, as well as helping to light worksites, campsites and other areas A. The center high mount stop light 20 of the present disclosure maintains its compliance with Federal Motor Vehicle Safety Standard 108 while also providing an integrated and highly flexible utility lighting proximal the rear end 2 of the vehicle 1. Numerous other advantages and benefits become available once the vehicle one includes a center mount stop light 20 according to the present disclosure.

The present description is intended to be illustrative and not restrictive. Many embodiments as well as many applications besides the exemplary embodiments provided will be apparent to those of ordinary skill in the relevant art upon understanding the present disclosure. The scope of the claimed invention should not be determined with limiting reference to the description but should instead be determined with reference to the appended claims along with the full scope of equivalents to which such claims are entitled. Any disclosure of an article or reference, including patent applications and publications, is incorporated by reference herein for all purposes. Any omission in the claims of any aspect of subject matter disclosed herein is not a disclaimer of such subject matter.

Any numerical values recited herein or in the figures are intended to include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. Unless expressly stated, all ranges are intended to include both endpoints and all numbers between the endpoints. The use of "generally," "about" or "approximately", or similar words, in connection with a range applies to both ends of the range. Thus, "about 20 to 30" is intended to cover "about 20 to about 30", inclusive of at least the specified endpoints.

The disclosure of "a" or "one" to describe an element, ingredient, component or step is not intended to foreclose additional elements, ingredients, components or steps. Plural elements, ingredients, components or steps may be provided by a single integrated element, ingredient, component or step. Alternatively, a single integrated element, ingredient, component or step may include separate plural elements, ingredients, components or steps.

The invention claimed is:

1. A stop light assembly for a vehicle, comprising:
   a stop light housing mountable on a rear end of the vehicle in a passage, the stop light housing and the passage located entirely above a vehicle rear window;
   an outer lens cover coupled to the stop light housing;
   a latch configured to selectively couple the stop light housing to the passage so that when the latch is actuated, the stop light housing moves between a first closed position and a second position, the second position including the stop light housing projecting out from the passage;
   an actuator coupled to the latch, the actuator configured to actuate the latch between a latched position and an unlatched position, the actuator coupled to the stop light housing;
   a utility light coupled to the stop light housing wherein the utility light is non-operational when the stop light housing is in the first closed position and the utility light is operational when the stop light housing is in the second position and the utility light is configured to illuminate an area adjacent the vehicle; and a sensor configured to determine the position of the stop light housing.

2. The stop light assembly of claim 1 wherein the sensor is configured to send a signal to the vehicle indicating the stop light housing is in the second position.

3. The stop light assembly of claim 2 wherein the utility light extends from the stop light housing when the stop light housing is in the second position.

4. The stop light assembly of claim 3 further comprising a biasing member for extending the utility light from the stop light housing as the stop light housing moves to the second position.

5. The stop light assembly of claim 3 further comprising a biasing member for extending the utility light from the stop light housing and wherein the utility light is automatically turned on as the stop light housing moves to the second position.

6. The stop light assembly of claim 1 further comprising a biasing member for automatically extending the utility light from the stop light housing and wherein the utility light is automatically turned on as the stop light housing moves to the second position.

7. The stop light assembly of claim 1 wherein the vehicle is inoperable when the stop light housing is in the second position.

8. The stop light assembly of claim 1 wherein the utility light is automatically turned off when the stop light housing is moved to the first closed position.

9. A center high mounted stop light assembly for a vehicle, comprising:
   a stop light housing mountable center high on a rear end of the vehicle in a passage, the stop light housing and the passage located entirely above a vehicle rear window;
   an outer lens cover coupled to the stop light housing;
   a latch configured to retain the stop light housing in the passage in the vehicle and configured to couple the stop light housing to the passage in the vehicle so that when the latch is actuated, the stop light housing moves from a first closed position toward a second position along a linear path of motion, the second position including the stop light housing linearly extended from the passage;
   an actuator coupled to the latch, the actuator configured to actuate the latch between a latched position and an unlatched position, the actuator coupled proximal the stop light housing; and
   a utility light coupled to the stop light housing wherein the utility light is non-operational when the stop light housing is in the first closed position and the utility light is operational when the stop light housing is in the second position and the utility light is configured to illuminate an area adjacent the vehicle.

10. The center high mounted stop light assembly of claim 9 wherein the vehicle is inoperable when the stop light housing is in the second position.

11. The center high mounted stop light assembly of claim 9 wherein the utility light is configured to rotate within the stop light housing to illuminate different areas without moving the vehicle.

12. The center high mounted stop light assembly of claim 9 wherein the utility light extends from the stop light housing when the stop light housing is in the second position.

13. The center high mounted stop light assembly of claim 9 further comprising a biasing member for extending the utility light from the stop light housing as the stop light housing moves to the second position.

14. The center high mounted stop light assembly of claim 9 further comprising a biasing member for extending the utility light from the stop light housing and wherein the utility light is automatically turned on as the stop light housing moves to the second position.

15. A center high mounted stop light assembly for a vehicle, comprising:
   a stop light housing mountable center high on a rear end of the vehicle in a passage, the stop light housing and the passage located entirely above a vehicle rear window;
   an outer lens cover coupled to the stop light housing;
   an automated mechanism for moving the stop light housing within the passage in the vehicle between a first closed position and a second position along a linear path of motion, the second position including the stop light housing linearly extended from the passage;
   an actuator coupled to automated mechanism configured to selectively operate the automated mechanism, the actuator for being coupled to the vehicle; and
   a utility light coupled to the stop light housing wherein the utility light is non-operational when the stop light housing is in the first closed position and the utility light is operational when the stop light housing is in the second position and the utility light is configured to illuminate an external area of the vehicle.

16. The center high mounted stop light assembly of claim 15 wherein the actuator is located proximal the outer lens cover.

17. The center high mounted stop light assembly of claim 15 wherein the actuator is located inside the interior of the vehicle.

18. The center high mounted stop light assembly of claim 17 wherein the actuator is located proximal the driver's seat of the vehicle.

19. The stop light assembly of claim 1, wherein a vehicle rear door remains closed when the stop light housing is in the second position.

20. The center high mounted stop light assembly of claim 9, wherein a vehicle rear door remains closed when the stop light housing is in the second position.

* * * * *